US009516808B2

(12) United States Patent
Takaoka et al.

(10) Patent No.: US 9,516,808 B2
(45) Date of Patent: Dec. 13, 2016

(54) GRASS MOWER

(71) Applicant: Kubota Corporation, Osaka-shi (JP)

(72) Inventors: Masaki Takaoka, Sakai (JP); Masato Asahara, Sakai (JP); Motosumi Shiotsuki, Sakai (JP); Hideki Aoki, Sakai (JP); Kazuaki Nogami, Sakai (JP); Akira Minoura, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/837,443

(22) Filed: Aug. 27, 2015

(65) Prior Publication Data

US 2016/0192585 A1 Jul. 7, 2016

(30) Foreign Application Priority Data

Jan. 6, 2015 (JP) .................. 2015-000997

(51) Int. Cl.
*A01D 34/66* (2006.01)
*A01D 34/73* (2006.01)
*A01D 101/00* (2006.01)

(52) U.S. Cl.
CPC ............ *A01D 34/66* (2013.01); *A01D 34/733* (2013.01); *A01D 2101/00* (2013.01)

(58) Field of Classification Search
CPC ........ A01D 34/66; A01D 34/82; A01D 34/74; A01D 34/866; A01D 67/00; A01D 69/03; A01D 69/10; A01D 75/28; A01D 34/733; A01D 2101/00
USPC ..... 56/11.9, 14.7, 14.9, 16.7; 180/6.48, 308, 180/333; 280/6.154
See application file for complete search history.

(56) References Cited

U.S. PATENT DOCUMENTS

| 5,161,353 A * | 11/1992 | Bergkamp ............ A01D 75/28 280/6.154 |
| 5,425,224 A * | 6/1995 | Downey .............. A01D 34/866 56/15.8 |
| 7,051,499 B2 * | 5/2006 | Goto ...................... A01D 69/10 56/14.9 |
| 7,325,387 B2 * | 2/2008 | Samejima ............. A01D 67/00 56/14.9 |
| 2011/0232250 A1 | 9/2011 | Sugio et al. |

FOREIGN PATENT DOCUMENTS

JP 2011205946 A 10/2011

* cited by examiner

*Primary Examiner* — Robert Pezzuto
(74) *Attorney, Agent, or Firm* — The Webb Law Firm (57) ABSTRACT

The grass mower includes a front wheel unit having a left front wheel and a right front wheel which are mounted to a vehicle body frame, a rear wheel unit having a left rear wheel and a right rear wheel which are mounted to the vehicle body frame and a mower unit disposed between the front wheel unit and the rear wheel unit downwardly of the vehicle body frame, the mower unit including a rotary blade unit that has at least a left blade and a right blade which are disposed side by side in a vehicle body left/right direction. The rotary blade unit is configured such that a tread-on track of the left front wheel is overlapped with a rotation locus portion of the left blade from the front side to the rear side thereof and a tread-on track of the right front wheel is overlapped with a rotation locus portion of the right blade from the front side to the rear side thereof.

5 Claims, 12 Drawing Sheets

GRASS MOWER

CROSS-REFERENCE TO RELATED APPLICATION

This application claims priority to Japanese Patent Application No. 2015-000997 filed Jan. 6, 2015, the disclosures of which is hereby incorporated in its entirety by reference.

BACKGROUND OF THE INVENTION

Field of the Invention

This disclosure relates to a grass mower with a mower unit mounted between front wheels and rear wheels downwardly of a vehicle body frame which is supported in contact with the ground surface by the front wheels and the rear wheels.

Description of the Related Art

A conventional grass mower, as disclosed in Japanese Unexamined Patent Application Publication No. 2011-205946 for instance, is configured such that an inter-rear-wheel centerline between a pair of left and right rear wheels and an inter-front-wheel centerline between a pair of left and right front wheels are present substantially on a centerline in a vehicle body front/rear direction. In the above patent document, a right blade rotational shaft is disposed on a front/rear direction line extending through a center of the width of the right front wheel and a left blade rotational shaft is disposed with a slight outward offset relative to a front/rear direction line extending through a center of the width of the left front wheel. In the case of such configuration as above, grass (lawn) assuming a forwardly leaning posture as a result of being pushed down forwardly (forward traveling direction of the grass mower) by the right front wheel is subject to a side blow cutting action from a right blade which is rotated from the left side to the right side (clockwise as seen in a plane view) of the blade. Also, grass (lawn) assuming a forwardly leaning posture as a result of being pushed down forwardly (forward traveling direction of the grass mower) by the left front wheel is subject to a side-blow like cutting action from a left blade which is rotated from the left side to the right side (clockwise as seen in a plane view) of the blade. In such case as above when a cutting in the form substantially of a side blow is attempted on grass (lawn) assuming a forwardly leaning posture by a blade which is rotated substantially from the left to the right side (clockwise as viewed in a plane view) of the blade, a sufficient cutting performance may not be achieved as the blade presses down the grass (lawn).

SUMMARY OF THE INVENTION

In view of the above-described state of the art, an object of the present invention is to provide a grass mower capable of cutting grass such as lawn assuming a forwardly leaning posture as being pushed down by a front wheel in as efficient as possible manner.

A grass mower according to the present invention comprises:

a vehicle body frame extending along a centerline of a vehicle body front/rear direction;

a front wheel unit having a left front wheel and a right front wheel which are mounted to the vehicle body frame;

a rear wheel unit having a left rear wheel and a right rear wheel which are mounted to the vehicle body frame; and a mower unit disposed between the front wheel unit and the rear wheel unit downwardly of the vehicle body frame, the mower unit including a rotary blade unit that has at least a left blade and a right blade which are disposed side by side in a vehicle body left/right direction;

wherein the rotary blade unit is configured such that a tread-on track of the left front wheel as seen in the plane view is overlapped with a rotation locus portion of the left blade from the front side to the rear side thereof and a tread-on track of the right front wheel as seen in the plane view is overlapped with a rotation locus portion of the right blade from the front side to the rear side thereof.

With the above-described configuration, grasses (lawn) that assume a forwardly leaning posture as being pushed down by the left front wheel and that form a tread-on track of the left front wheel will be cut while receiving a raising action by the rotation locus portion of the left blade rotated from the front side to the rear side. Similarly, grasses (lawn) that assume a forwardly leaning posture as being pushed down by the right front wheel and that form a tread-on track of the right front wheel will be cut while receiving a raising action by the rotation locus portion of the right blade rotated from the front side to the rear side. With these, grasses such as lawn assuming a forwardly leaning posture as being pushed down by the front wheels can be cut in an efficient manner and cutting leftovers can be restricted.

In order to cut (mow) grasses (lawn) treaded on by a font wheel by a rotation locus portion of a blade which is rotated from the front side to the rear side, the front wheel needs to be displaced in the vehicle body lateral direction unless the rotary blade unit is displaced significantly in the vehicle body lateral direction. However, if the running track of the front wheel is not confined within the running track of the rear wheel, it will be necessary to mount a wide slope plate on a track of the grass mower for loading/unloading thereof, so the loading/unloading convenience will deteriorate. In order to avoid this problem, according to one preferred embodiment of the present invention:

a center position between the left front wheel and the right front wheel is offset from the centerline of the vehicle body front/rear direction; and a center of a running track of the left front wheel is confined within a width of the left rear wheel and a center of a running track of the right front wheel is confined within a width of the right rear wheel.

In the case of a grass mower with a mower unit mounted between the front wheels and the rear wheels, for the purpose of e.g. a maintenance of the mower unit, a front-wheel connecting arm which interconnects the left and right front wheels is attached to a vehicle body frame to be pivotable in the left/right direction of the vehicle body and while one front wheel is kept in contact with the ground surface, the other front wheel will be floated up, thereby to create a large maintenance space downwardly of the mower unit. In the course of this, the greater the distance between the grounded front wheel and the pivot axis, the easier to create a large maintenance space. According to one preferred embodiment of the present invention:

a front-wheel connecting arm extends in the vehicle body left/right direction to interconnect the left front wheel and the right front wheel;

a front-wheel pivot axis extending in the vehicle body front/rear direction is arranged on the centerline in the vehicle body front/rear direction; and the front wheel unit is pivoted by pivoting the front-wheel connecting arm.

By combing this feature with the above-described feature that a center position between the left front wheel and the right front wheel is offset from the centerline of the vehicle body front/rear direction, it becomes readily possible to create a large maintenance space for a same front wheel tread width.

A mower unit often employed in a grass mower is of a type having three blades disposed side by side. With this type of mower unit, in order to realize an efficient grass cutting operation through cooperation of the three rotary blades, it is preferred that inter-center distances of the blades be same. Further, at the time of e.g. a grass mowing operation, for the purpose of aligning an outer end of the blade with a border between a cutting-uncompleted ground and a cutting-completed ground, a configuration allowing an outer end of the mower unit being readily visible by the driver is desirable. To this end, according to preferred embodiment of the present invention:

the mower unit further includes a center blade between the left blade and the right blade;

a rotational shaft of the center blade is offset from the vehicle body front/rear centerline; and a distance between the rotational shaft of the center blade and a rotational shaft of the left blade is arranged at a same distance as a distance between the rotational shaft of the center blade and a rotational shaft of the right blade.

In the above configuration, still preferably, a direction of the offset of the rotational shaft of the center blade relative to the vehicle body front/rear centerline is set opposite to a direction of the offset of the center position between the left front wheel and the right front wheel relative to the vehicle body front/rear direction centerline.

The above facilitates realization of the above-described layout between the front wheels and the mower unit that the tread-on track of the left front wheel is overlapped with the rotation locus portion of the left blade from the front side to the rear side and also the tread-on track of the right front wheel is overlapped with the rotation locus portion of the right blade from the front side to the rear side.

In case an engine is to be disposed at a rear portion of the vehicle body, in particular, rearwardly of the rear wheels, for the stability of the vehicle body, it is preferred that an output shaft of the engine be aligned with the vehicle body front/rear direction centerline and the center position between the left front wheel and the right front wheel is also aligned with the vehicle body front/rear direction centerline.

DETAILED DESCRIPTION OF THE PREFERRED EMBODIMENTS

Figure 1:
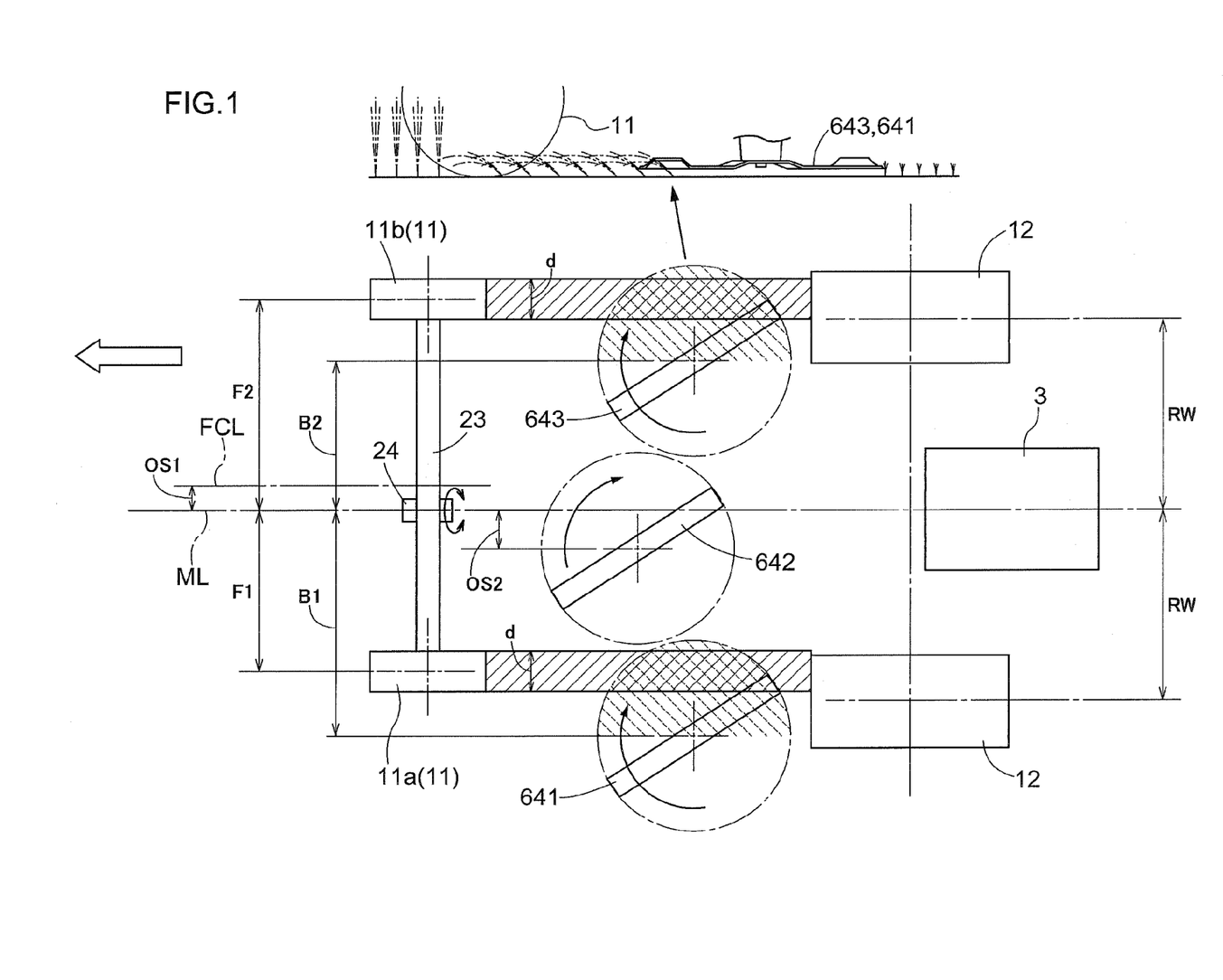
FIG. 1 is a schematic diagram showing basic layout of left and right front wheels and a rotary blade unit according to the present invention.

Prior to explaining specific embodiments of a grass mower relating to the present invention, with reference to FIG. 1, there will be explained layout relation between blades (cutter blades) rotatable about vertical axes and front wheels, which relation characterizes the present invention. The grass mower shown is FIG. 1 is schematic, thus showing only a left front wheel 11a and a right front wheel 11b which support, in contact with a ground surface, a vehicle body frame (not shown in FIG. 1) extending along a vehicle body front/rear direction, a pair of left and right rear wheels 12, a left blade 641, a center blade 642 and a right blade 643 which together constitute a blade unit, an engine 3, and a front-wheel connecting arm 23 interconnecting the left front wheel 11a and the right front wheel 11b. In the following discussion, where no distinction between the left front wheel 11a and the right front wheel 11b is needed, merely the front wheel 11 will be recited.

Incidentally, in this detailed disclosure, in principle, the front/rear direction refers to the longitudinal direction (running/traveling direction) of the grass mower, the lateral direction (left/right direction) refers to the width direction of the grass mower (direction perpendicular to the front/rear direction), and the vertical direction refers to the direction perpendicular to the ground surface(horizontal surface).

In FIG. 1, the tread-on tracks along which the front wheels 11 roll while treading on grasses (lawn) are shown as areas with diagonal lines and the width of the track is denoted with a mark (d). The front wheels 11 are offset to the right side in the lateral direction relative to a vehicle body front/rear direction centerline ML. Namely, a length F1 from the vehicle body front/rear direction centerline ML to the center of the left front wheel 11a is made shorter than a length F2 from the vehicle body front/rear direction centerline ML to the center of the right front wheel 11b; and a centerline FCL between the left front wheel 11a and the right front wheel 11b is offset to the right side by an offset amount OS1 relative to the vehicle body front/rear direction centerline ML. The pair of left and right rear wheels 12 are disposed in symmetry relative to the vehicle body front/rear direction centerline ML, with distances RW of the respective rear wheels 12 from the vehicle body front/rear direction centerline ML being equal to each other. The engine 3 too is arranged such that its crank shaft is substantially in alignment with the vehicle body front/rear direction centerline ML. In this respect, however, the center of each front wheel 11 is confined within the width of the corresponding rear wheel 12, and the running track of the front wheel 11 is confined substantially within the running track of the rear wheel 12.

The left front wheel 11a and the right front wheel 11b are interconnected via a front-wheel connecting arm 23. This front-wheel connecting arm 23 is pivotally attached to the vehicle body not shown in FIG. 1 at a position on the vehicle body front/rear direction centerline ML by means of a front-wheel pivot unit 24. A pivot axis of this front-wheel pivot unit 24 which extends in the vehicle body front/rear direction is present substantially on the vehicle body front/rear direction centerline ML. With this, a distance from the pivot axis of the front-wheel pivot unit 24 to the right front wheel 11b is longer than a distance from the same to the left front wheel 11a, so that for a same pivot angle, the vehicle body can be lifted up higher in the case of a pivotal posture with keeping the right front wheel 11b in contact with the ground surface.

Conversely from the front wheels 11, the blade unit consisting of the three blades 641, 642, 643 is offset to the left side in the lateral direction relative to the vehicle body front/rear direction centerline ML.

Namely, a length B1 from the vehicle body front/rear direction centerline ML to the left blade 641 is made longer than a length B2 from the vehicle body front/rear direction centerline ML to the right blade 643; and a center of the center blade 642 is offset to the left side by an offset amount OS2 relative to the vehicle body front/rear direction centerline ML.

The lateral offset between the blade unit consisting of the three blades 641, 642, 643 and the front wheels 11 is created substantially by the offset amount OS1 and the offset amount OS2. In this invention, the two offset amounts OS1, OS2 are determined such that a tread-on track of the left front wheel 11a as seen in the plane view is overlapped with a rotation locus portion of the left blade 641 from the front side to the rear side thereof and a tread-on track of the right front wheel 11b as seen in the plane view is overlapped with a rotation locus portion of the right blade 643 from the front side to the rear side thereof. With this arrangement, as schematically shown in FIG. 1, grasses such as lawn which assume a forwardly leaning posture as being pushed down by the front wheels 11 can be cut in an efficient manner and cutting leftovers can be restricted.

Figure 2:
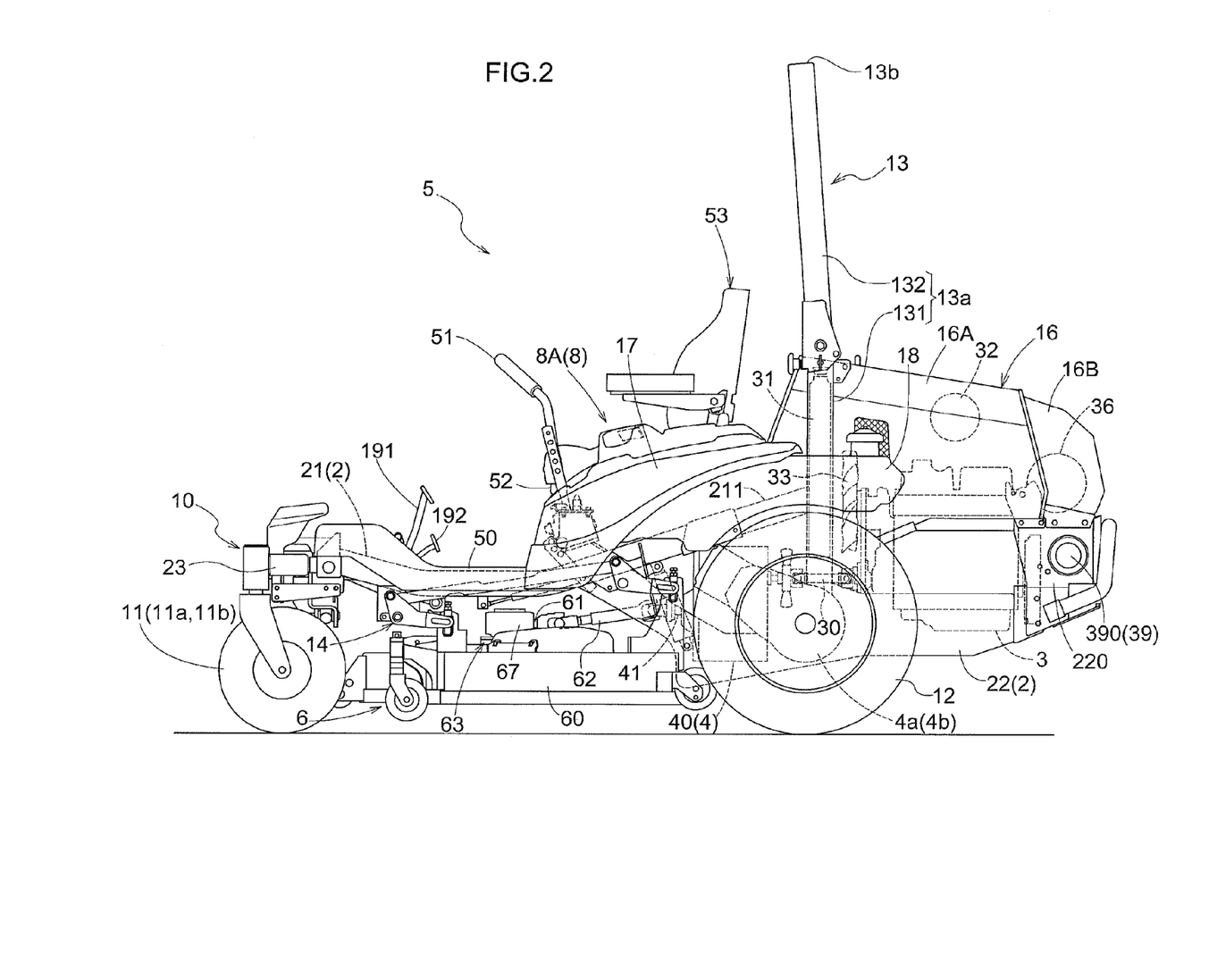
FIG. 2 is a side view of a zero-turn mower as an example of a grass mower relating to the present invention.
Figure 3:
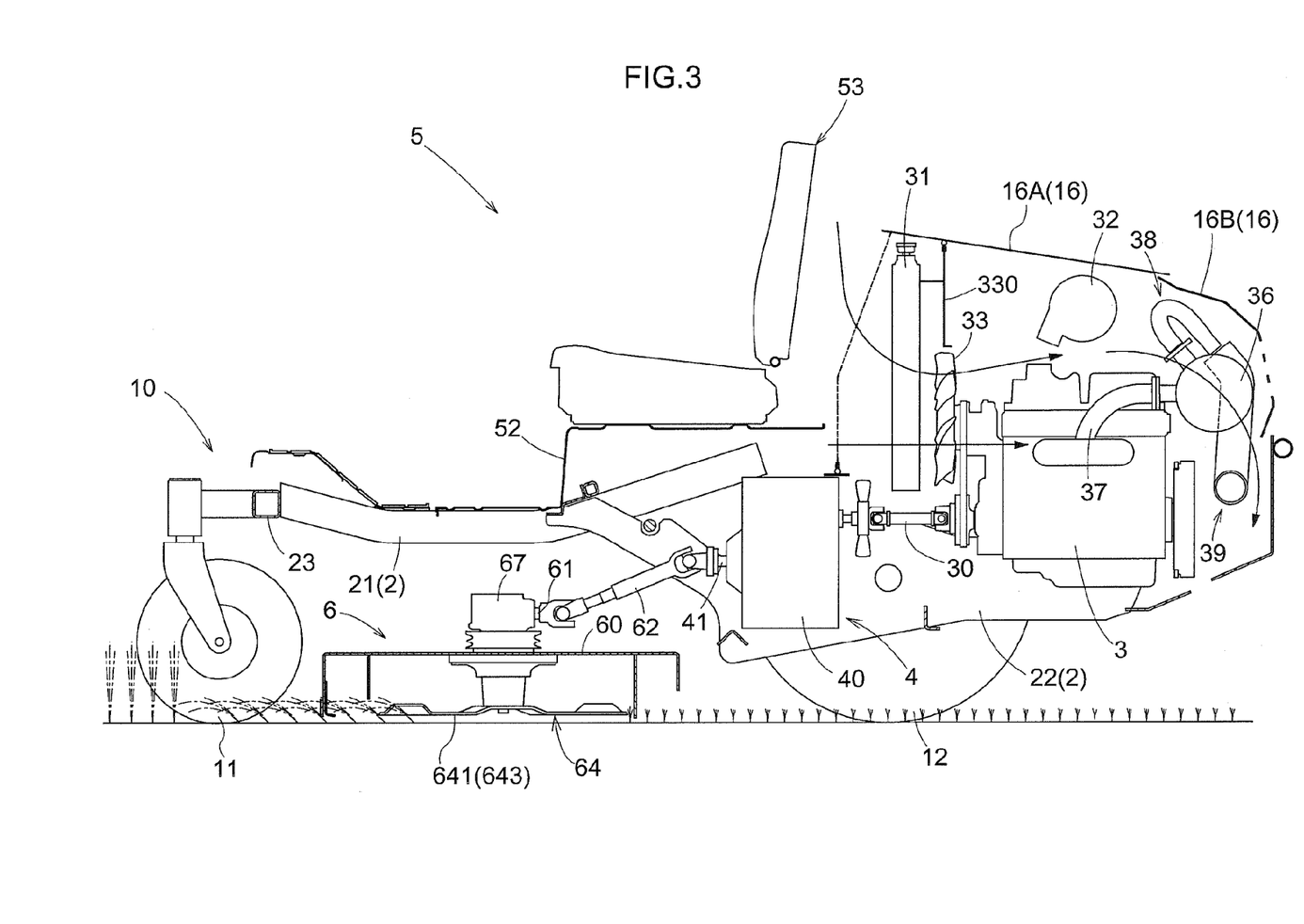
FIG. 3 is a schematic side view showing an internal structure of the zero-turn mower with better visibility.
Figure 4:
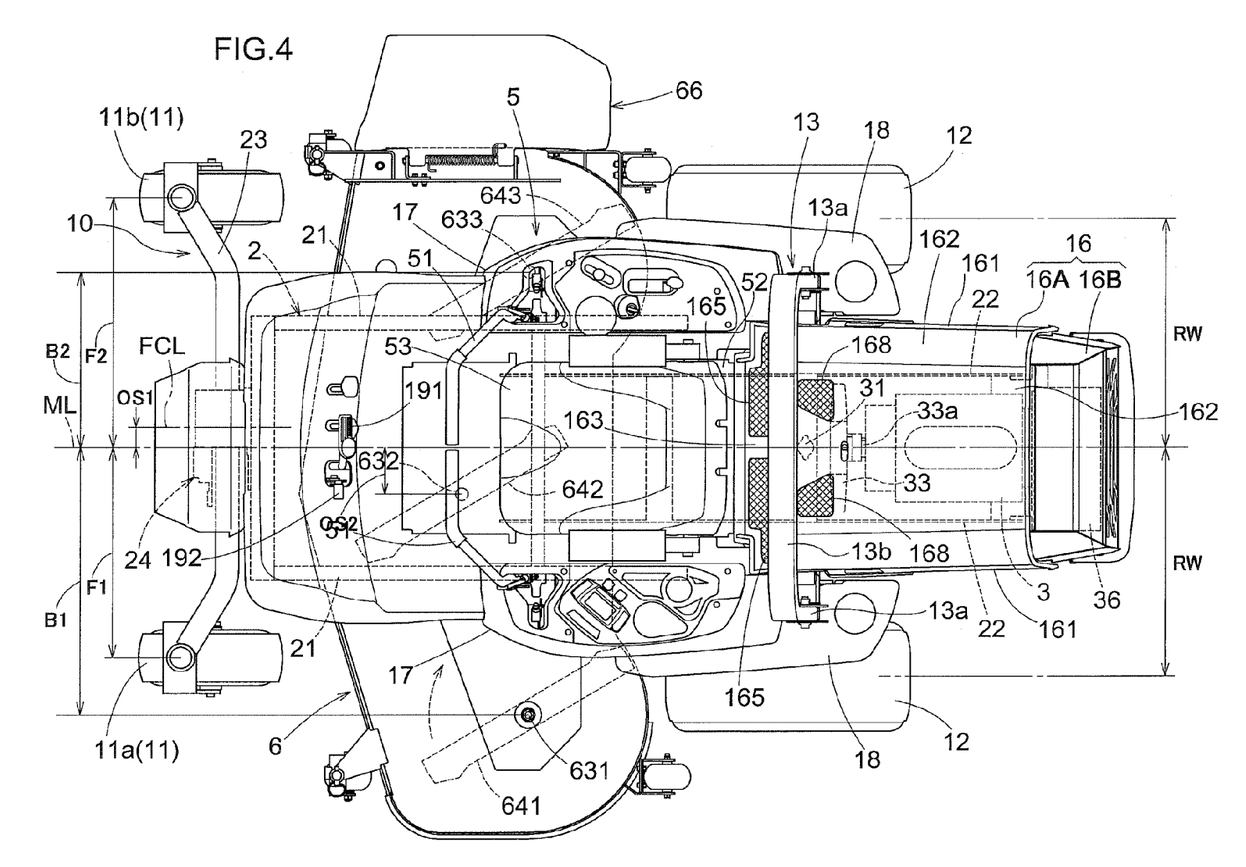
FIG. 4 is a plane view of the zero-turn mower.
Figure 5:
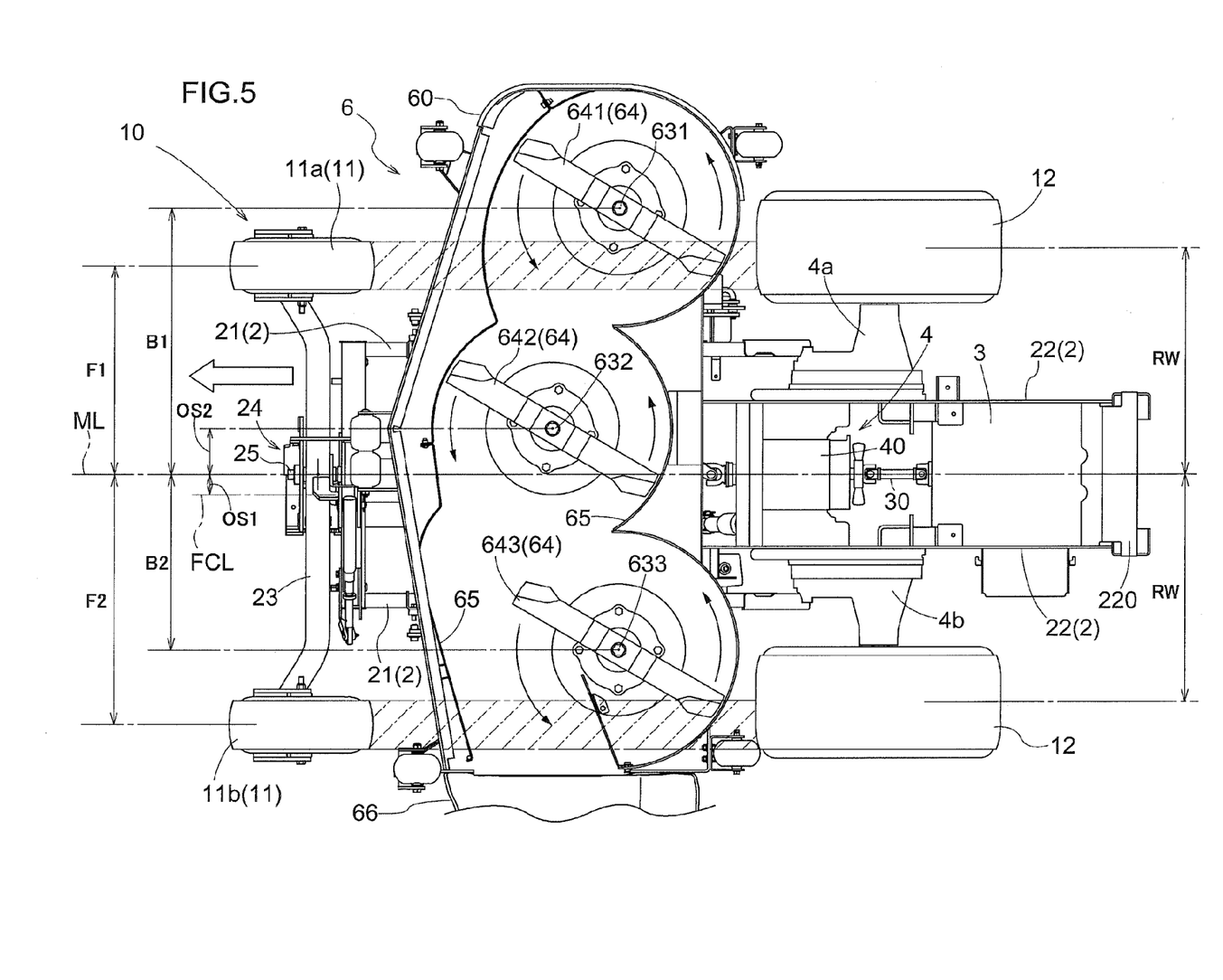
FIG. 5 is a bottom view of the zero-turn mower.
Figure 6:
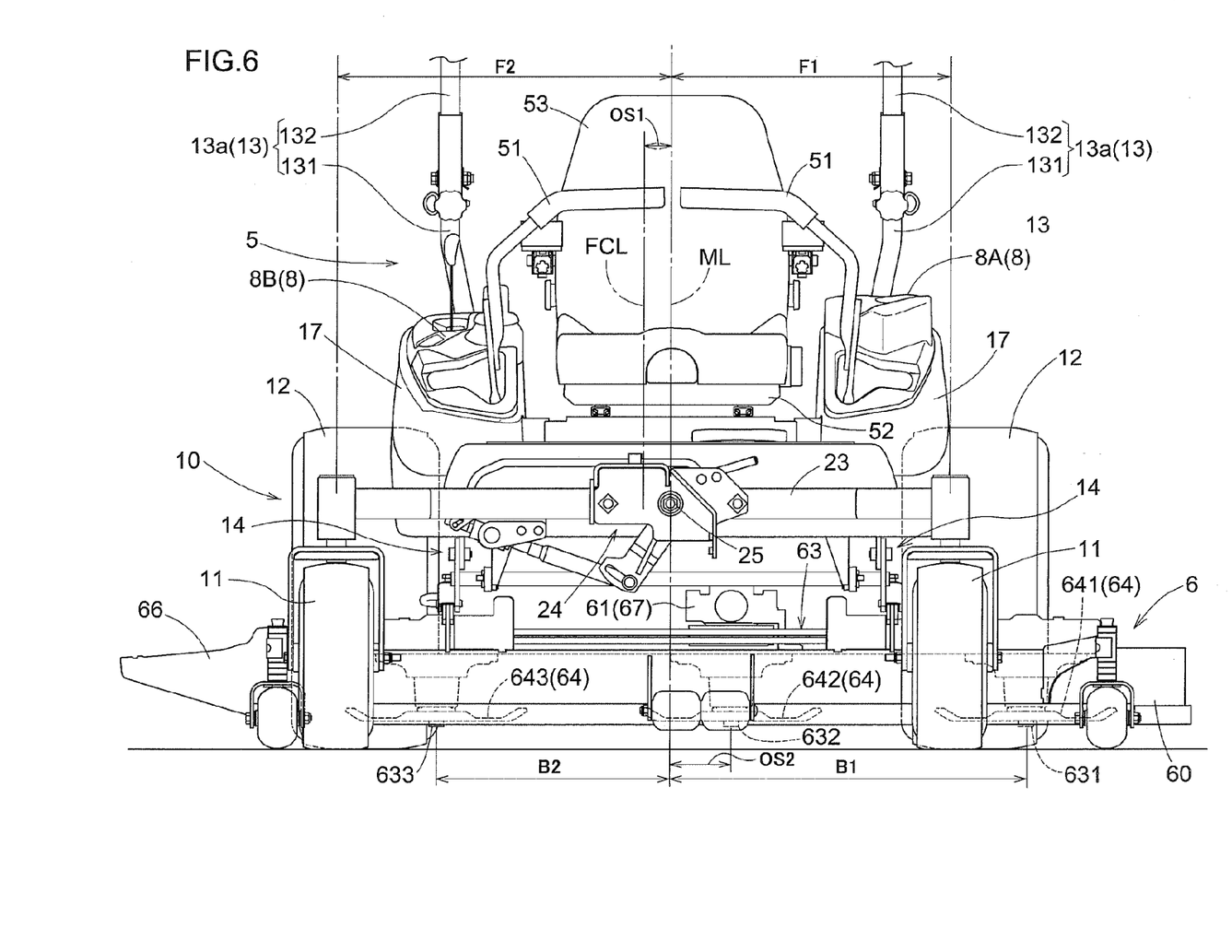
FIG. 6 is a front view of the zero-turn mower.

Next, with reference to the accompanying drawings, there will be explained a grass mower which is sometimes referred to also as a zero-turn mower, as one specific embodiment of the grass mower relating to the present invention. In this embodiment too, there is adopted the same layout relation between the blades and the front wheels 11 explained hereinbefore with reference to FIG. 1. FIG. 2 is a side view of the zero-turn mower. FIG. 3 is a schematic side view for facilitating explanation of its inner structure. FIG. 4 is a plane view of the zero-turn mower. FIG. 5 is a bottom view. FIG. 6 is a front view.

This zero-turn mower includes a traveling vehicle body 10 supported in contact with the ground surface by a front wheel unit having the pair of left and right front wheels 11 and a rear wheel unit having the pair of left and right rear wheels 12. The traveling vehicle body 10 includes a vehicle body frame 2 as a base component. A mower unit 6 is suspended from the vehicle body frame 2 via a link mechanism 14 between the front wheels 11 and the rear wheels 12. A driver's section 5 is arranged in a center region in the vehicle body front/rear direction of the traveling vehicle body 10. Therefore, in the driver's section 5, a seat support 52 is fixed on the vehicle body frame 2 (see FIG. 2), and a driver's seat 53 is mounted on the upper face of the seat support 52. On the left and right side faces of the seat support 52, fenders 17 are formed. On the upper faces of the fenders 17, a control panel 8 is provided. Downwardly of the fenders 17, a fuel tank 18 is disposed. At a foot region of the driver's seat 53, a step 50 is provided on a front frame 21. A brake pedal 191 is disposed adjacent a center of the front region of the step 50. On the lateral side of the brake pedal 191, there is disposed a brake lock pedal 192 for parking configured to maintain the brake pedal 191 at a stepped-on position.

A ROPS (rollover protection system) device 13, as shown in FIG. 2 and FIG. 6, includes a pair of left and right posts 13a, and a transverse member 13b interconnecting upper ends of the posts 13a. Each post 13a is configured to be pivotally foldable at its intermediate portion. A leg portion 131 as a lower half portion of the post 13a is bent inwards at a substantially same height position as the upper end of a rear frame 22 and extends to reach the rear end of the front frame 21. The rear end of the front frame 21 and the leg portion 131 of the ROPS device 13 are connected to each other via a connecting bracket. A straight post portion 132 as an upper half portion of the post 13a is connected to the leg portion 131 to be pivotable between a vertical posture and a lateral (or downward) posture via a pivot connecting portion.

At the rear portion of the driver's section 5, the ROPS device 13 is disposed. At a rear end region of the traveling vehicle body 10, the engine 3 is disposed, and forwardly and slightly downwardly of the engine 3, a transmission 4 is disposed. This transmission 4 includes a left rear axle transmission section 4a and a right rear axle transmission section 4b. In FIG. 2 illustration, the left rear axle transmission section 4a alone is denoted with dot lines. As shown in FIG. 5, on the right side of the vehicle body, the right rear axle transmission section 4b is arranged at the position in line-symmetry relative to the left rear axle transmission section 4a. The left rear axle transmission section 4a and the right rear axle transmission section 4b each incorporates an independently operable hydrostatic speed changing mechanism (HTS) as an example of stepless speed changer mechanism. The hydrostatic speed changing mechanism is capable of changing power of the engine under a forward rotation (forward traveling) and a reverse rotation (reverse traveling) state from a lower speed to a higher speed in a stepless manner and then transmitting the changed engine power to each rear wheel 12 of the rear wheel unit. So that, with driving in the forward traveling direction of the left and right rear wheels 12 at a same or substantially same circumferential speed, a forward straight traveling is provided; and with driving in the reverse traveling direction of the left and right rear wheels 12 at a same or substantially same circumferential speed, a reverse straight traveling is provided. Further, by making the speeds of the left and right rear wheels 12 different from each other, the traveling vehicle body 10 can be turned in a desired direction. For instance, by rendering one of the left and right rear wheels 12 to a low speed near a zero speed and operating the other rear wheel 12 at a high speed to the forward or reverse traveling side, a small turn is made possible. Further, by driving the left and right rear wheels 12 in opposite directions, it is possible to cause the traveling vehicle body 10 to effect a spin-turn about the substantial center between the left and right rear wheels 12. The front wheels 11 are configured as a pair of left and right caster wheels, whose orientations can be freely changed about vertical axes. And, these orientations are to be corrected in accordance with the traveling direction by the driving of the left and right rear wheels 12.

A speed changing operation on the transmission 4, in particular, speed changing operations on the left rear axle transmission section 4a and the right rear axle transmission section 4b are effected by a pair of left and right speed changing levers 51 disposed on the opposed sides of the driver's seat 53. When the speed changing lever 51 is maintained at a front/rear neutral position, the stepless speed changer device is rendered to a neutral stop state. When the speed changer lever 51 is operated forwardly from the neutral position, a forward traveling speed change is realized. When the lever 51 is operated rearwardly from the neutral position, a reverse traveling speed change is realized.

As shown in FIG. 4 and FIG. 5, the vehicle body frame 2 of the traveling vehicle body 10 is comprised of the front frame 21 having a wide width and the rear frame 22 having a narrow width. The front frame 21 and the rear frame 22 are formed of a pair of left and right vertical beams extending in the vehicle body front/rear direction and a cross beam interconnecting the vertical beams. The lateral width of the front frame 21 (the spacing between the left and right vertical beams) is greater than the lateral width of the rear frame 22. As seen in the plane view, the front portion of the rear frame 22 is embedded in the rear portion of the front frame 21, and these are connected to each other by an unillustrated connecting member. To the rear end of the rear frame 22, there is fixed a rear end frame 220 which is formed like a box so as to create a space rearwardly of the engine 3.

At the center of the rear frame 22, the engine 3 is mounted with an anti-vibration arrangement. An input shaft 30 for transmitting engine power to the transmission 4 extends substantially horizontally and coaxially with an extension portion of a crank shaft which projects forwardly from a lower portion of a front wall of the engine 3. In order to secure as high as possible ride-over height for the left front wheel 11a or the right front wheel 11b, it is necessary to increase the ground clearance of the rear portion of the traveling vehicle body 10. For this reason, the engine 3 is disposed at a position higher than the transmission 4 from the ground surface. As shown in FIG. 3, from the front wall of a transmission case 40 of the transmission 4, a PTO (power take-off) shaft 41 for transmitting power to the mower unit 6 projects forwardly. The ground clearance of the transmission 4 is made low so as to prevent an inclination angle of a PTO relay shaft 62 connecting the above PTO shaft 41 and a PTO input shaft 61 of the mower unit 6 from becoming large.

Figure 7:
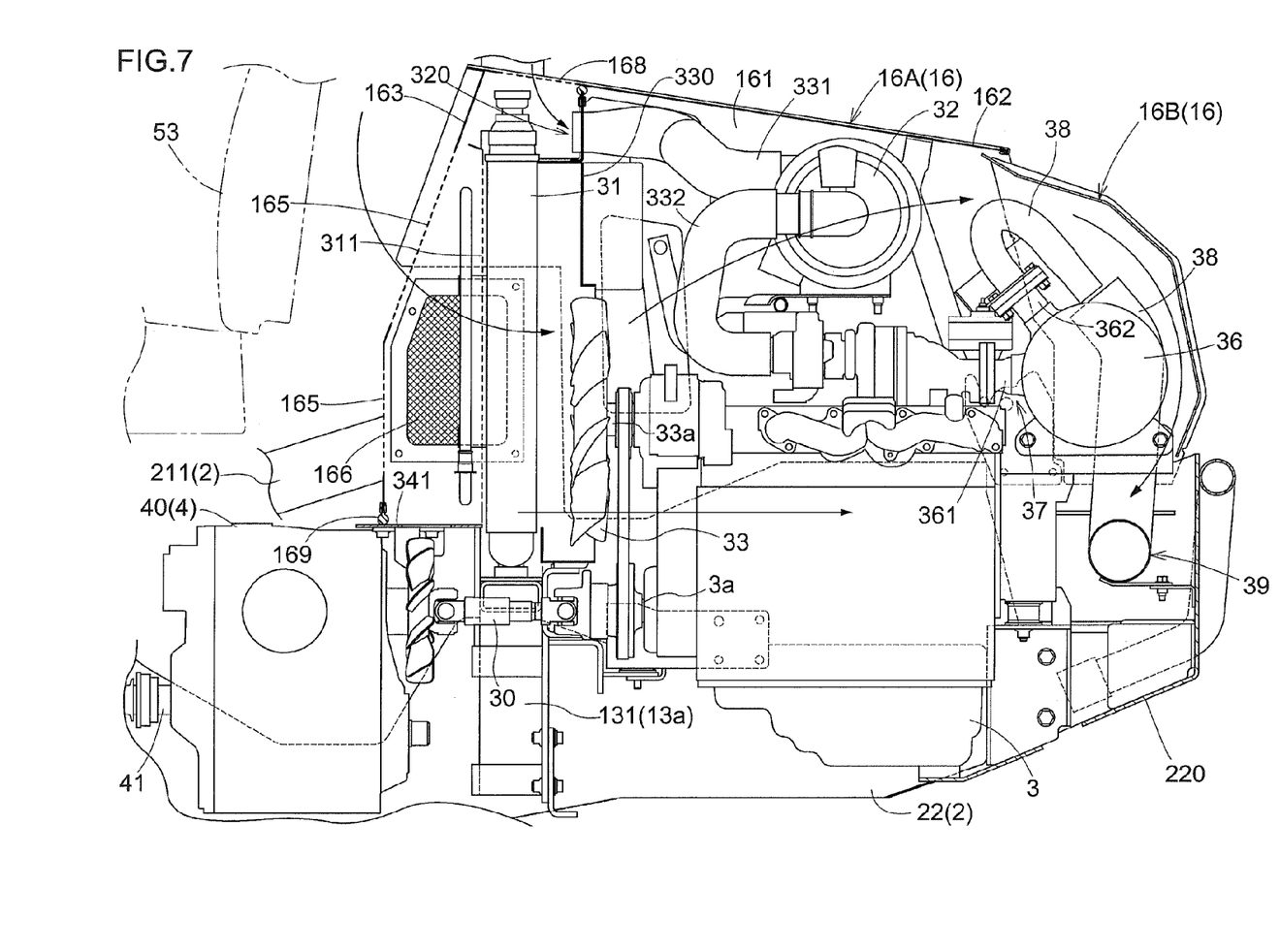
FIG. 7 is a side view of an engine room.

As shown in FIG. 3, a cooling fan 33 is disposed forwardly of the engine 3, with an upper end thereof being at a substantially same height as the upper end of the engine 3. The cooling fan 33 is provided at an upper portion of the front wall of the engine 3 and includes a rotational shaft 33a extending in the front/rear direction and receiving power belt-transmitted from the extension portion of the crank shaft (see FIG. 4). Forwardly of the cooling fan 33, a radiator 31 is disposed. This radiator 33 is disposed under an erect posture, that is, to extend along the perpendicular direction, such that its cooling face is placed to face a rotation locus face of the cooling fan 33. The lower end of the radiator 31 is disposed adjacent the input shaft 30, and the height of its lower end is at a position which is substantially midway between the upper end of the transmission 4 and the input shaft 30. Between the cooling fan 33 and the radiator 31, a shroud 330 is formed. As shown in FIG. 6 and FIG. 7, left and right side portions of the shroud 330 extend to the lateral plate portions of the engine hood 16, thus functioning also as partitioning walls for partitioning an engine room into an engine-side space and a radiator-side space.

As shown in FIG. 3, the engine hood 16 that creates the engine room is comprised of a fixed hood 16B which is a rear hood fixed to the rear end frame 220 and a movable hood 16A which is opened/closed forwardly about a horizontal axis located on the rear side.

Figure 8:
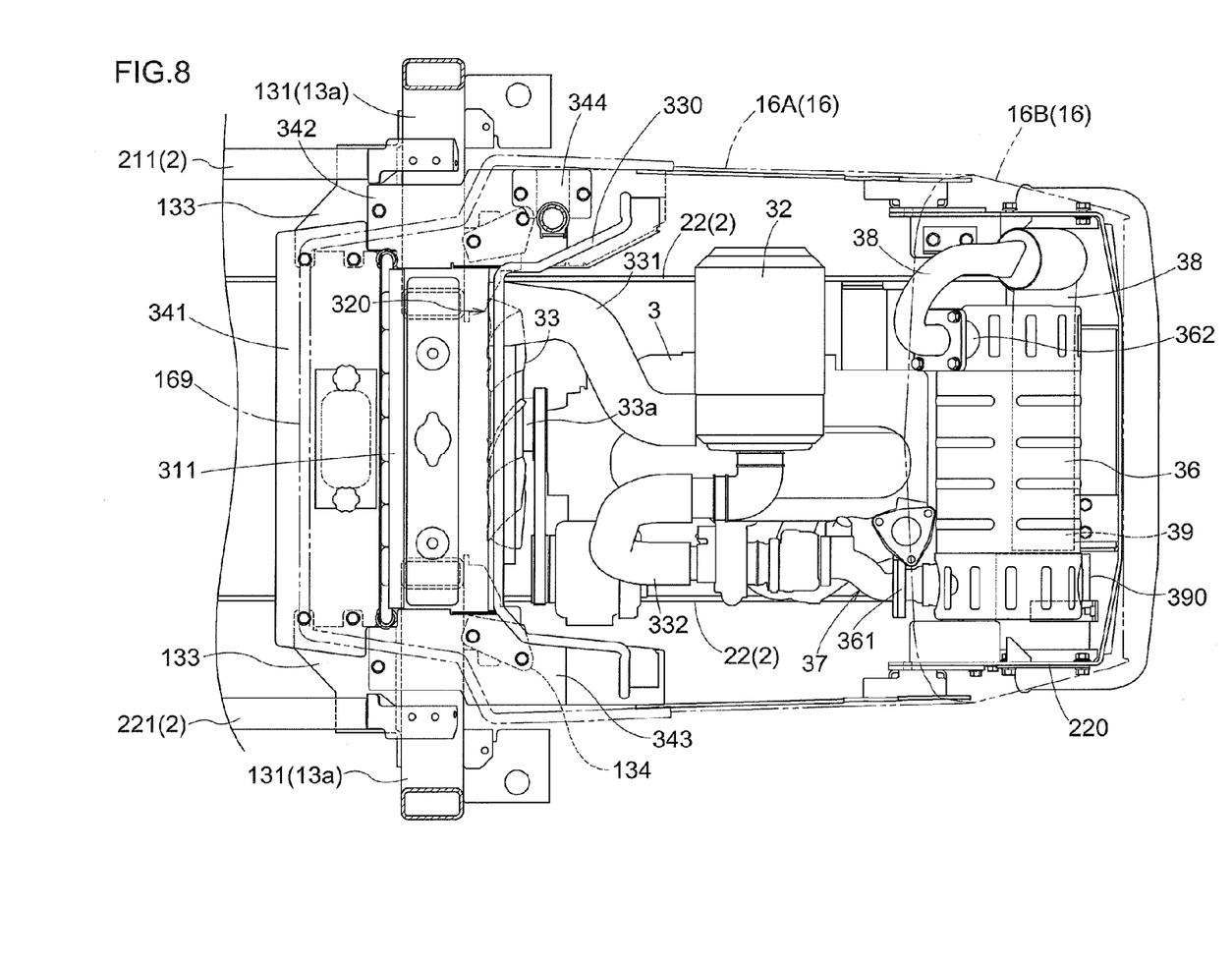
FIG. 8 is a plane view of the engine room.

As shown in FIG. 7 and FIG. 8, upwardly of the engine 3, a cylindrical air cleaner 32 is disposed with a lateral orientation (the axis of the cylinder extends along the vehicle body left/right direction). An exhaust gas cleaning device 36 is disposed rearwardly of the engine 3 and substantially at the height level of the engine 3, with a lateral orientation (the axis of the cylinder extends along the vehicle body left/right direction). This exhaust gas cleaning device 36 incorporates a filter called DPF for collecting particulate matter contained in exhaust gas exhausted from the engine 3. The exhaust gas cleaning device 36 is incorporated in an exhaust gas pipe system of the engine 3. The exhaust gas pipe system consists of an exhaust terminal end portion 39 forming a discharge outlet 390 for discharging exhaust gas to the outside of the vehicle body, an inlet side exhaust gas flow passage 37 connecting an exhaust manifold of the engine 3 with an inlet 361 of the exhaust gas cleaning device 36, and an outlet side exhaust gas flow passage 38 connecting an outlet 362 of the exhaust gas cleaning device 36 and the exhaust terminal end portion 39. The discharge outlet 390 is disposed so as to discharge exhaust gas from the left side of the rear end frame 220 in the lateral direction.

As shown in FIG. 2 and FIG. 3, the mower unit 6 includes a mower deck 60 consisting of a ceiling wall and a circumferential wall extending downwards from an outer circumference of the ceiling wall. Further, as shown in FIG. 5 and FIG. 6, the mower deck 60 includes a blade unit 64 consisting of the left blade 641, the center blade 642 and the right blade 643. For this reason, the mower deck 60 includes a belt type transmission unit 63 for distributing power received via the PTO input shaft 61 to a first rotational shaft 631, a second rotational shaft 632 and a third rotational shaft 633 disposed side by side in the lateral direction and having vertical axes. To the first rotational shaft 631, the left blade 641 is attached. To the second rotational shaft 632, the center blade 642 is attached. To the third rotational shaft 633, the right blade 643 is attached. The left blade 641, the center blade 642 and the right blade 643 are rotated respectively clockwise as seen in the plane view (see FIG. 1). On the outer side of the rotation locus of the blade unit 64, a baffle 65 is provided and grasses cut by the left blade 641, the center blade 642 and the right blade 643 are discharged via a cut-grass discharging section 66 formed in the right end portion of the mower deck 60. Therefore, the border line between a cutting-uncompleted ground and a cutting-completed ground will appear on the left side of the mower deck 60, so that the driver will carry out a grass-cutting traveling operation with aligning the left blade 641 with the border line between a cutting-uncompleted ground and a cutting-completed ground.

As shown in FIG. 4, FIG. 5 and FIG. 6, with this zero-turn mower too, the pair of left and right front wheels 11 are offset laterally to the right side relative to the vehicle body front/rear direction centerline ML and the blade unit consisting of the three blades is offset laterally to the left side relative to the vehicle body front/rear direction centerline ML, conversely from the front wheels 11. Namely, the centerline FCL between the left front wheel 11a and the right front wheel 11b is offset to the right side by an offset amount OS1 relative to the vehicle body front/rear direction centerline ML. And, the center of the center blade 642 projecting forwardly at the position approximately midway between the left blade 641 and the right blade 643 is offset to the left side by an offset amount OS2 relative to the vehicle body front/rear direction centerline ML. In this example, the offset amount OS1 is about ⅓ of the front wheel width (d) (see FIG. 1), and the offset amount OS2 is from ⅓ to ½ of the blade radius.

With the above-described arrangement, a tread-on track of the left front wheel 11a as seen in the plane view is overlapped with a rotation locus portion of the left blade 641 from the front side to the rear side thereof and also a tread-on track of the right front wheel 11b as seen in the plane view is overlapped with a rotation locus portion of the right blade 643 from the front side to the rear side thereof. As a result, grasses such as lawn which assume a forwardly leaning posture as being pushed down by the front wheels 11 can be cut in an efficient manner by the respective rotation locus portions of the left blade 641 and the right blade 643 moving from the front side to the rear side.

As may be apparent from FIG. 5 and FIG. 6, with this zero-turn mower too, the left front wheel 11a and the right front wheel 11b are interconnected via a front-wheel connecting arm 23. This front-wheel connecting arm 23 is pivotally attached at a position on the vehicle body front/rear direction centerline ML by means of a front-wheel pivot unit 24. The front-wheel pivot axis 25 of this front-wheel pivot unit 24 is present substantially on the vehicle body front/rear direction centerline ML.

Figure 9:
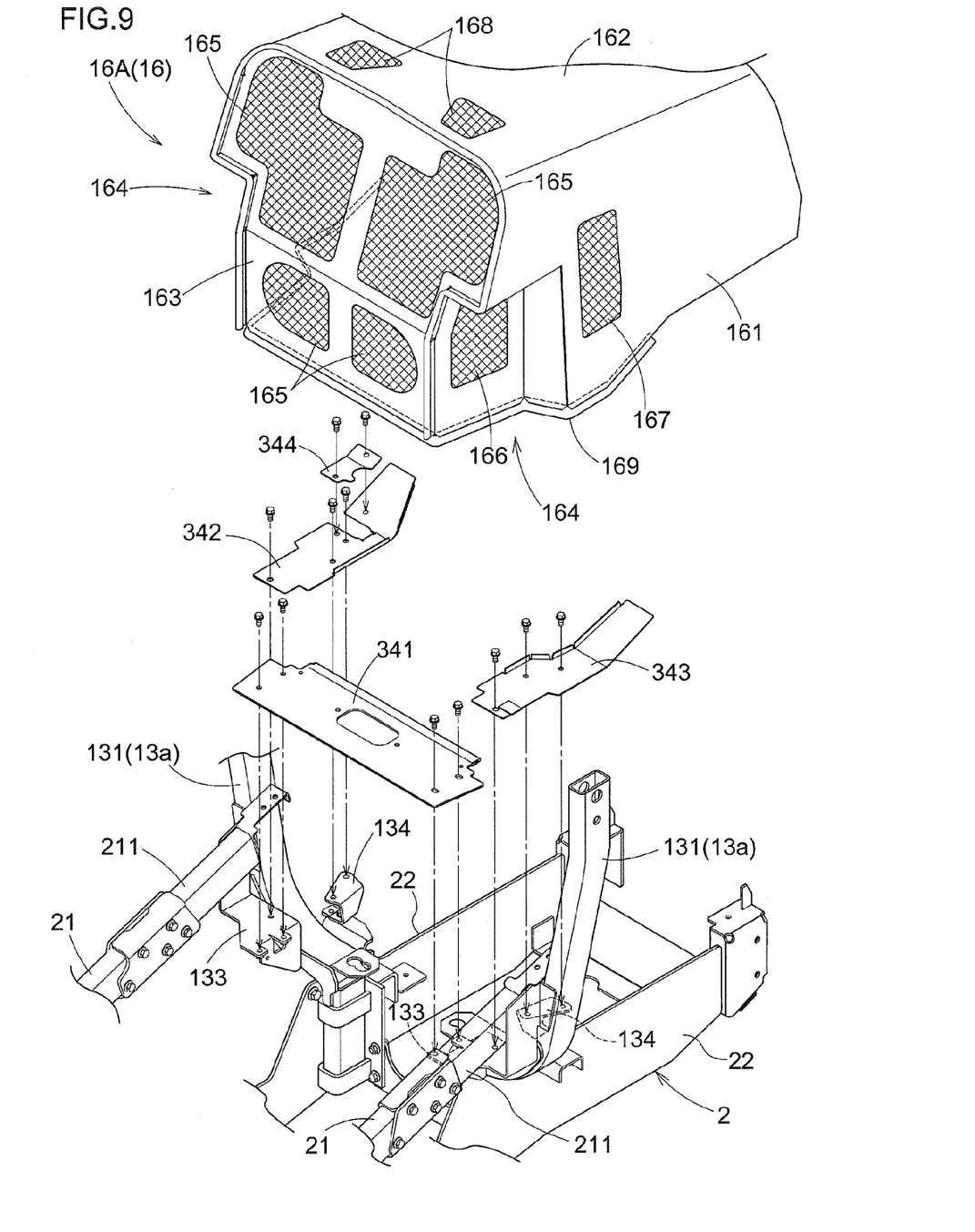
FIG. 9 is an exploded perspective view showing a closure structure of an engine hood.

As shown in FIG. 9, the movable hood 16A consists of a pair of left and right side plates 161 forming the lateral face, a ceiling plate 162 forming the upper face and a front plate 163 forming the front face, and a rear face of the movable hood 16A being opened. In the entire front plate 163, a plurality of opening portions 165 are provided. And, at front end regions of the side plates 161 and the ceiling plate 162, there are respectively provided a plurality of opening portions 167 and 168. To these opening portions 165, 167, 168, dust-proof nets are attached. At a front-side lower half portion of the side plate 161, there is formed a recessed portion 164 having a rectangular shape and to the wall faces (side face and upper face) of this recessed portion 164 too, there are formed opening portions 166 with dust-proof net attached thereto. Therefore, as shown in FIG. 8, the cooling fan 33 can suction to generate cooling air also from the upper and the side face of the movable hood 16A.

To the lower edge of the front portion of the movable hood 16A, a cushion trim 169 having a U-shape in a plane view is fitted. In order to receive this cushion trim 169 to close the space downwardly of the vehicle body, one first receiving plate 341, two second receiving plates 342 and two third receiving plates 343 are provided (respecting the second receiving plates 342 and the third receiving plates 343, only one on the right side respectively thereof is shown in FIG. 9). As shown in FIG. 9, the rear end of the front frame 21 is connected to an auxiliary frame 211 which is fixed via a pair of left and right first brackets 133 to the leg portions 131 of the ROPS device 13. Each first bracket 133 forms an attaching seat for attaching the first receiving plate 341.

With the above, the first receiving plate 341 is attached to bridge (interconnect) the leg portions 131 of the ROPS device 13 to each other. To each leg portion 131, on the rear side of the first bracket 133, a second bracket 134 is fixed. Between the first bracket 133 and the second bracket 134, a second receiving plate 342 is attached. This second receiving plate 342 is disposed to extend rearwards from the left end and the right end of the first receiving plate 341 extending in the lateral direction. And, the radiator 31 is mounted erect in such a manner as to extend through the area delimited by the first receiving plate 341 and the second receiving plate 342 (see FIG. 7). A third receiving plate 343 is an auxiliary closing plate for closing a gap. That is, a closed area closed by the cushion trim 169 in the front portion of the movable hood 16A is divided into regions forwardly and rearwardly of the radiator 31 respectively. With this arrangement, with removal of the first receiving plates 341 alone, maintenance inspections of the transmission 4 and the universal joints connecting the engine 3 to the transmission 4 are made possible.

Figure 10:
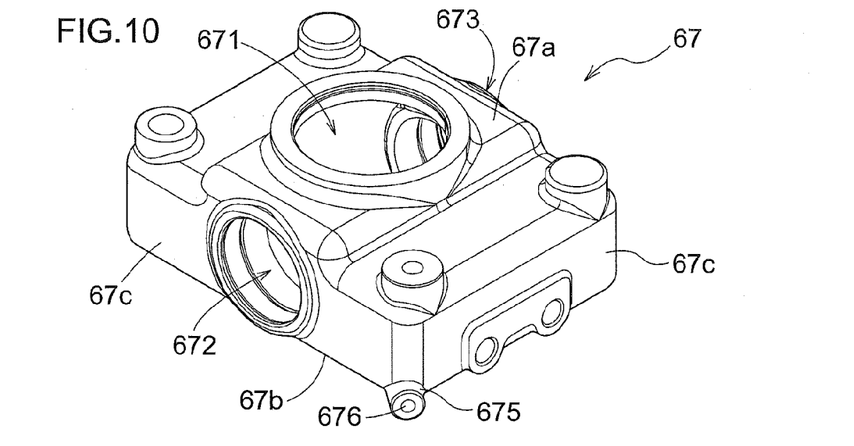
FIG. 10 is a perspective view of a transmission case of the mower unit.
Figure 11:
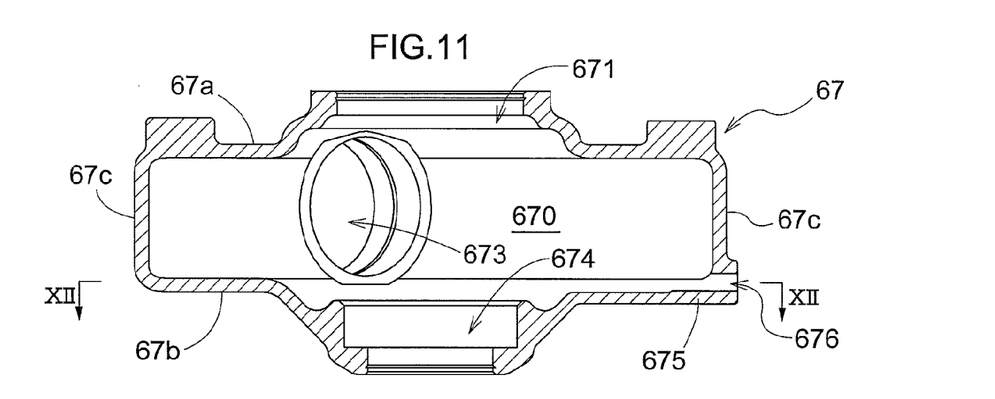
FIG. 11 is a vertical section showing the transmission case sectioned along a drain hole.
Figure 12:
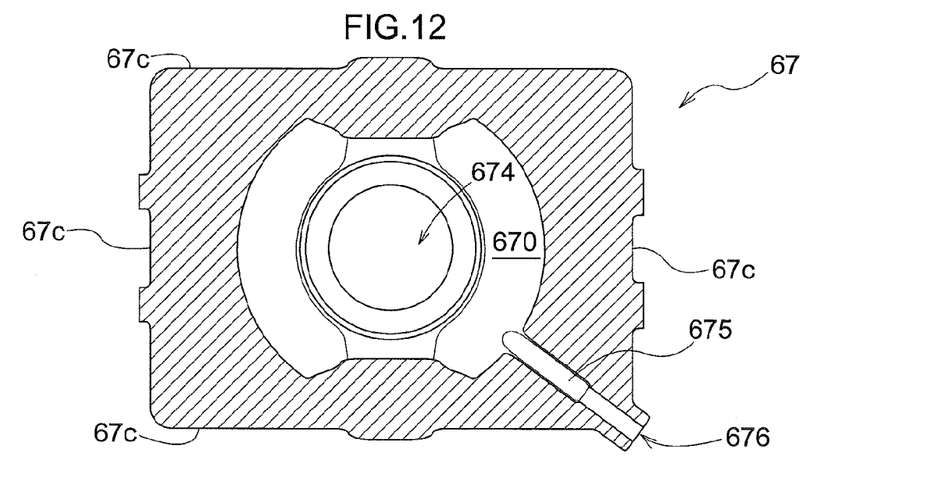
FIG. 12 is a horizontal section showing the transmission case sectioned along the drain hole.

FIG. 10, FIG. 11 and FIG. 12 show a transmission case 67 of the mower unit 6. This transmission case 67 includes an inner chamber 670 surrounded by a ceiling wall 67a, a bottom wall 67b and a lateral wall 67c. The ceiling wall 67a and the bottom wall 67h respectively define an upper boss hole 671 and a lower boss hole 674 for a transmission shaft which extends in the vertical direction. In the lateral wall 67c opposing thereto, there are formed a first side boss hole 672 and a second side boss hole 673 for a transmission shaft which extends in the lateral direction. The transmission case 67 is to incorporate an unillustrated transmission gear set, so an amount of oil will be charged in the inner chamber 670. In this transmission case 67, a drain hole 676 for draining the charged oil is provided at a draining portion 675 formed in the upper face of the bottom wall 67b which forms the boundary area between the side wall 67c and the bottom wall 67b. Further, the leading end of the draining portion 675 projects from the lateral wall 67c thereby to facilitate an operation of pulling out a plug which is to be attached to this leading end of the draining portion 675. With the above-described arrangement, a draining operation of the oil filled in the inner chamber 670 can be carried out easily and the oil can be drained in a reliable manner.

Figure 13:
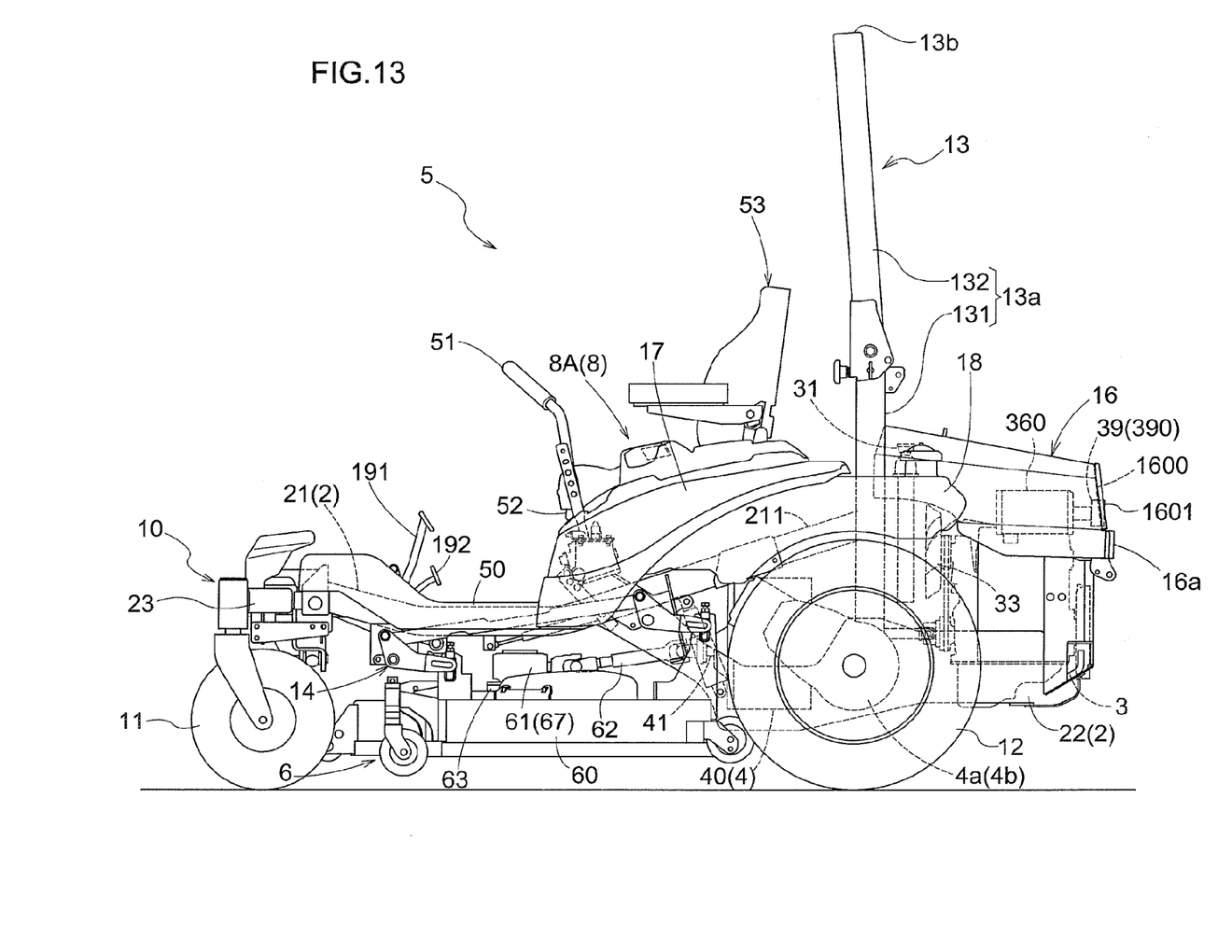
FIG. 13 is a side view showing a further embodiment of the zero-turn mower.

FIG. 13 shows a zero-turn mower which is partially different from the zero-turn mower of the foregoing embodiment shown in FIG. 2, etc. In this zero-turn mower, instead of the exhaust gas cleaning device 36, there is provided a conventional muffler 360. This muffler 360 is arranged with its axis being aligned with the vehicle body front/rear direction, so that exhaust gas introduced from the front side is caused to flow to the rear side. To this end, a discharge outlet 390 of an exhaust gas terminal end portion 39 is opened toward the vehicle body rear side.

Figure 14:
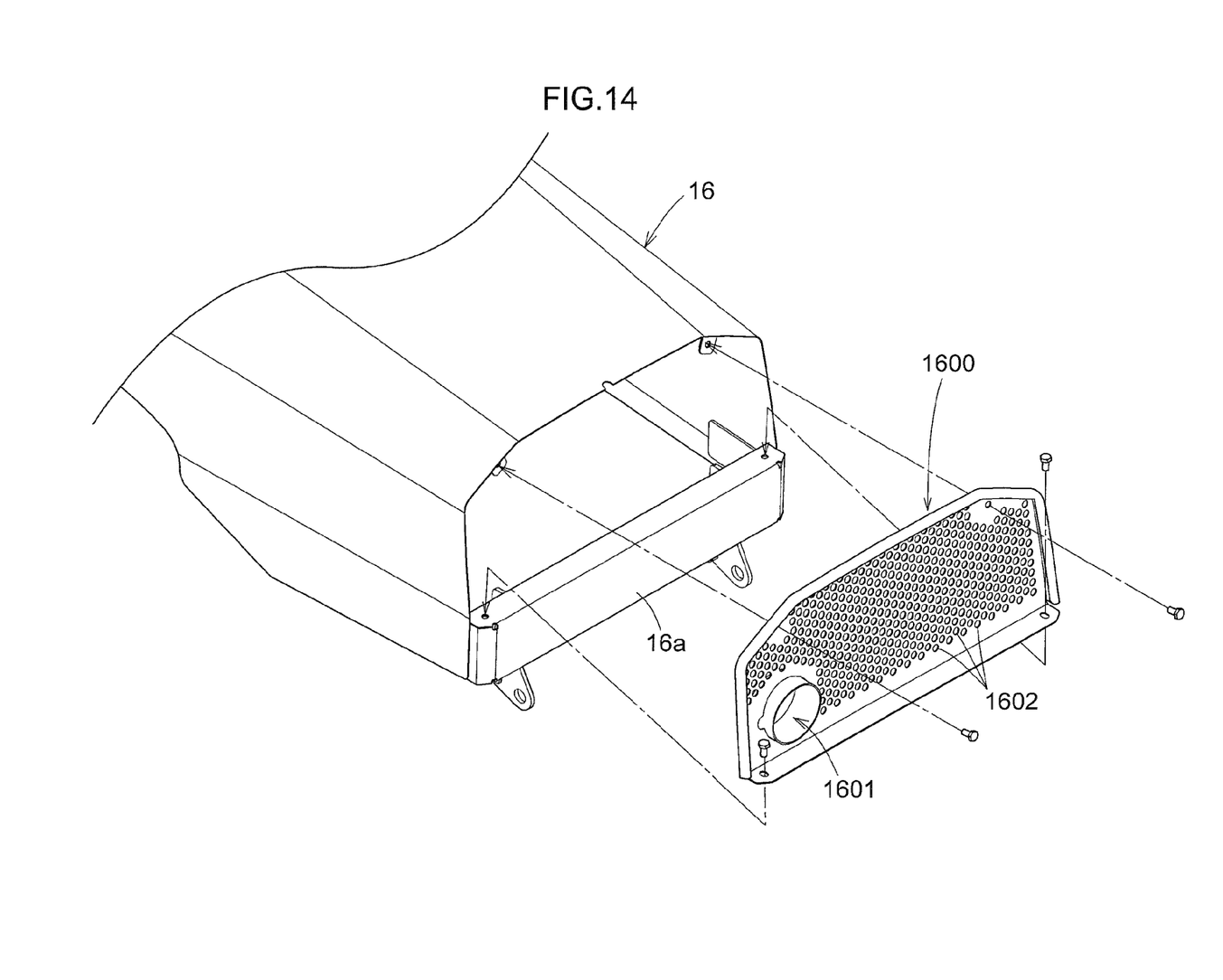
FIG. 14 is a perspective view showing an engine hood rear face region of the zero-turn mower shown in FIG. 13.

An engine hood 16 is of a non-divided type and this single unitary hood 16 is pivotable about a lateral pivotal axis at the rear lower portion. As shown in FIG. 14, the rear face of the hood 16 consists of a rear face base portion 16a covering the rear face lower region and a rear face plate 1600 covering the rear face upper region.

The rear face plate 1600 is detachably fixed with attaching screws. In substantially entire face of the rear face plate 1600, many ventilation holes 1602 are formed. However, at the portion corresponding to the discharge opening 390 of the exhaust gas terminal end portion 39, there is formed an exhaust opening 1601. Incidentally, the vicinity of the exhaust opening 1601 will be blackened with soot of exhaust gas. However, as the rear face plate 1600 is provided as a component separate from the other members, it is readily possible to paint this rear face plate 1600 in black and to paint the hood 16 and the rear face base portion 16a in some light colors. Further, for different types of zero-turn mowers whose exhaust gas terminal end portion 39 is located at a different position, the rear face plate 1600 alone can be replaced, while the hood 16 and the rear face base plate 16a can be used commonly.

[Other Embodiments]

(1) In the foregoing embodiment, as an example of the grass mower there has been employed a grass mower called a zero-turn mower whose left and right rear wheels 12 can be driven independently of each other. However, the present invention is applicable also to a grass mower having front wheels 11 configured as steerable wheels and left and right rear wheels 12 connected to each other via a differential mechanism.

(2) In the foregoing specific embodiment, the mower unit 6 includes three blades. However, the number of blades can also be two or four or more.

The invention claimed is:

1. A grass mower comprising:
a vehicle body frame extending along a centerline of a vehicle body front/rear direction;
a front wheel unit having a left front wheel and a right front wheel which are mounted to the vehicle body frame;
a rear wheel unit having a left rear wheel and a right rear wheel which are mounted to the vehicle body frame; and
a mower unit disposed between the front wheel unit and the rear wheel unit downwardly of the vehicle body frame, the mower unit including a rotary blade unit that has at least a left blade and a right blade which are disposed side by side in a vehicle body left/right direction;
wherein the rotary blade unit is configured such that a tread-on track of the left front wheel as seen in the plane view is overlapped with a rotation locus portion of the left blade from the front side to the rear side thereof and a tread-on track of the right front wheel as seen in the plane view is overlapped with a rotation locus portion of the right blade from the front side to the rear side thereof; and
wherein the left front wheel and the right front wheel have a center position that is equidistant from the left front wheel and the right front wheel the center position being offset from the centerline of the vehicle body front/rear direction; and
a center of a running track of the left front wheel is confined within a width of the left rear wheel and a center of a running track of the right front wheel is confined within a width of the right rear wheel.

2. The grass mower according to claim 1, wherein:
a front-wheel connecting arm extends in the vehicle body left/right direction to interconnect the left front wheel and the right front wheel;
a front-wheel pivot axis extending in the vehicle body front/rear direction is arranged on the centerline in the vehicle body front/rear direction; and
the front wheel unit is pivoted by pivoting the front-wheel connecting arm.

3. The grass mower according to claim 1, wherein:
the mower unit further includes a center blade between the left blade and the right blade;
a rotational shaft of the center blade is offset from the vehicle body front/rear centerline; and
a distance between the rotational shaft of the center blade and a rotational shaft of the left blade is arranged at a same distance as a distance between the rotational shaft of the center blade and a rotational shaft of the right blade.

4. The grass mower according to claim 3, wherein:
a direction of the offset of the rotational shaft of the center blade relative to the vehicle body front/rear centerline is set opposite to a direction of the offset of the center position between the left front wheel and the right front wheel relative to the vehicle body front/rear direction centerline.

5. The grass mower according to claim 3, wherein:
a center position between the left rear wheel and the right rear wheel is aligned with the centerline of the vehicle body front/rear direction; and
an output shaft of an engine which is disposed rearwardly of the rear wheel unit is aligned with the vehicle body front/rear direction centerline.

* * * * *